United States Patent [19]

Brindöpke et al.

[11] Patent Number: 4,859,788

[45] Date of Patent: Aug. 22, 1989

[54] CURING COMPONENTS FOR SYNTHETIC RESINS AND THEIR USE

[75] Inventors: Gerhard Brindöpke, Frankfurt am Main; Claus Godau, Kiedrich; Walter Weber, Hofheim am Taunus, all of Fed. Rep. of Germany

[73] Assignee: Hoechst AG, Fed. Rep. of Germany

[21] Appl. No.: 178,476

[22] Filed: Apr. 7, 1988

[30] Foreign Application Priority Data

Apr. 9, 1987 [DE] Fed. Rep. of Germany ....... 3711947

[51] Int. Cl.$^4$ .............................................. C07C 101/20
[52] U.S. Cl. .................................. 558/398; 558/442; 558/445; 560/155; 560/156; 560/168; 560/169; 560/170; 560/171; 560/35; 560/41; 528/119
[58] Field of Search ........................ 558/445, 442, 348; 564/153, 160, 197, 199; 560/156, 168, 169, 155, 170, 171, 35, 41

[56] References Cited

U.S. PATENT DOCUMENTS

| | | | |
|---|---|---|---|
| 2,152,132 | 3/1939 | Boese | 564/199 X |
| 2,174,239 | 9/1939 | Gleason | 564/199 X |
| 2,325,567 | 7/1943 | Bock et al. | 564/160 X |
| 2,447,196 | 8/1948 | Martin et al. | 564/160 X |
| 4,036,985 | 7/1977 | Amato et al. | 564/160 X |

*Primary Examiner*—Earl Nielsen
*Attorney, Agent, or Firm*—Bierman and Muserlian

[57] ABSTRACT

Amino group containing curing component (A) for compounds (B) which contain epoxy or 1,3-dioxolan-2-one groups, comprising a reaction product of ($a_1$) active CH alkyl esters of isocyanate adducts thereof with ($a_2$) polyamines.

Mixtures of (A) and (B) with or without diluents and additives give rapid curing even at low temperatures and high atmospheric humidity and are suitable in particular for paint formulations.

10 Claims, No Drawings

CURING COMPONENTS FOR SYNTHETIC RESINS AND THEIR USE

DESCRIPTION

It is known that alcohols, in particular phenols, accelerate the curing reaction between primary and secondary amino groups with epoxy resins (cf. for example U.S. Pat. No. 3,366,600, DE Pat. Nos. 1,043,629 and 2,025,343). A similar effect can also be obtained by addition of carboxylic acids, in particular salicylic acid and lactic acid (cf. U.S. Pat. No. 3,026,285).

The known combinations have proved successful to some extent, but they also have disadvantages, such as insufficient acceleration in some cases at low temperatures ($\leq 5°$ C.) and at high humidities. The combinations having phenolic OH groups can be used only to a limited extent from a toxicological aspect, especially if the phenols are not incorporated completely into the cured network. This is in particular a disadvantage in the case of the coating of containers which are intended to hold substances for food consumption.

Therefore, there is a demand for further curing systems in particular for epoxy resins, it being desirable that these curing systems are sufficiently reactive in particular at low temperatures and high humidities and that the groups which act as an accelerant in these systems are incorporated into the network.

The invention accordingly provides an amino group-containing curing component (A) for compounds (B) containing epoxy or 1,3-dioxolan-2-one groups, wherein the curing component (A) is a reaction product from (a$_1$) active CH alkyl esters or from isocyanate adducts of active CH alkyl esters with (a$_2$) polyamines.

The invention further relates to curable mixtures containing the curing component (A) and also to the use of this curing component in curable mixtures, in particular in paint formulations.

The curing component (A) according to the invention comprises polyaminoamides which are obtained by the reaction of (a$_1$) active CH alkyl esters or isocyanate adducts thereof with (a$_2$) polyamines and contain at least one —CH— group having an acidic (active) hydrogen.

The component (a$_1$) preferably has the formula (I)

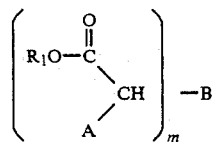

in which
R$_1$ denotes a hydrocarbon radical having 1 to 12 carbon atoms, preferably a branched or unbranched aliphatic radical having 1 to 10, preferably 1 to 6 carbon atoms or a cycloaliphatic radical having 5 to 12, preferably 6 to 10 carbon atoms, or an aralkylene radical having 7 to 12, preferably 8 to 10 carbon atoms;
A denotes CN, COOR$_1$, CONH$_2$, CONR$_1$H, CONR$_1$R′$_1$, COR$_1$ or R$_1$C=NR$_1$′R$_1$, it being possible for R′$_1$ and R$_1$ to be identical or different and to have the abovementioned meaning, or less preferably denotes NO$_2$;
B denotes hydrogen or R$_1$ having the abovementioned meaning, m being 1 in both cases or denotes

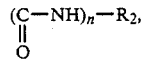

in which R$_2$ represents an n-valent hydrocarbon radical, preferably a (cyclo)aliphatic or aromatic radical having preferably 1 to 30, in particular 4 to 20, carbon atoms which can optionally be interrupted by hetero atoms (O, N) and $m=n \geq 1$, preferably 1 to 10 and in particular 1, 2 or 3.

In this formula (I), R$_1$ preferably stands for (C$_1$–C$_6$)-alkyl, A for COO(C$_1$–C$_6$-alkyl) or for CO(C$_1$–C$_6$-alkyl) and B stands for hydrogen or

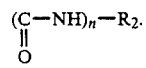

Examples of (a$_1$) malonic dialkyl esters of alcohols having 1 to 12 carbon atoms, such as dimethyl malonate, diethyl malonate, dibutyl malonate, diisopropyl malonate, are the corresponding esters of malonamide and N-alkyl derivatives thereof, acetoacetic esters, such as methyl acetoacetate, ethyl acetoacetate, propyl acetoacetate, butyl acetoacetate and also the corresponding Schiff's bases, the corresponding esters of cyanoacetic acid, and also the isocyanate adducts of these compounds, such as mono- or polyisocyanates. The isocyanate adducts are preferred.

Examples of suitable monoisocyanates are aliphatic isocyanates such as n-butyl isocyanate, octadecyl isocyanate, cycloaliphatic isocyanates such as cyclohexyl isocyanate, araliphatic isocyanates such as benzyl isocyanate or aromatic isocyanates such as phenyl isocyanate.

Polyisocyanates which are preferably used are the readily accessible substances such as 2,4- and/or 2,6-toluylenediisocyanate, hexamethylenediisocyanate and isophoronediisocyanate (IPDI). Further suitable compounds are those known for polyurethane chemistry, including the corresponding prepolymers. Examples of such polyisocyanates are the aliphatic trimethylene, tetramethylene, pentamethylene, 1,2-propylene, 1,2-butylene, 2,3-butylene, 1,3-butylene, ethylidine and butylidine diisocyanates, 2,2,4-trimethylhexamethylene diisocyanate, 1,12-dodecane diisocyanate, dicycloalkylene diisocyanates such as 1,3-cyclopentane diisocyanates, 1,4-cyclopentane diisocyanates and 1,2-cyclohexane diisocyanates, 1,3-cyclohexane diisocyanates and 1,4-cyclohexane diisocyanates; furthermore, diisocyanates of dimeric acids, aromatic diisocyanates, such as 1,3-phenylene diisocyanates, 1,4-phenylene diisocyanates, 4,4′-diphenyl diisocyanates, 1,5-naphthalene diisocyanates and 1,4-naphthalene diisocyanates, aliphatic-aromatic diisocyanates such as 2,4′- or 4,4′-diphenylmethane diisocyanates, 4,4′-toluidine diisocyanates and 1,4-xylylene diisocyanates, perhydro 2,4′- and/or 4,4′-diphenylmethane diisocyanate, 3,2′- and/or 3,4-diisocyanato-4-methyldiphenylmethane, dianisidine diisocyanate, 4,4′-diphenyl ether diisocyanate and chlorodiphenylene diisocyanate, triisocyanates such as triphenylmethane 4,4′,4″-triisocyanate, 1,3,5-benzene triisocyanate and 2,4,6-toluene triisocyanate, and tetraisocyanates such as 4,4′-diphenyldimethyldimethane 2,2′-5,5′-tetraisocyanate or mixtures of these compounds.

In addition to these simple polyisocyanates, suitable polyisocyanates are also those containing hetero atoms in the radical which connects the isocyanate groups. Examples of those are polyisocyanates which have carbodiimide groups, allophanate groups, isocyanurate groups, urethane groups, acylated urea groups and biuret groups.

Suitable polyisocyanates are finally also the known prepolymers having terminal isocyanate groups, such as are accessible in particular by reaction of the abovementioned simple polyisocyanates, in particular diisocyanates, with less than equivalent amounts of organic compounds having at least two groups which are reactive towards isocyanate groups. Compounds which can be used in such a manner are in particular those having altogether at least two amino groups and/or hydroxyl groups, such as alkanolamines, primary, secondary and tertiary alcohols having 1 to 10 carbon atoms, di- or polyols. These polyvalent alcohols are for example ethanediol, the various propanediols, butanediols, pentanediols and hexanediols, polyethylenediols and polypropylenediols, glycerol, trimethylolethane and trimethylolpropane, pentaerythritol, hexanetriol and sorbitol.

Of these isocyanates, the mono-, di- and triisocyanates are preferred. In the case of polyisocyanates, free isocyanate groups which have not been reacted with the active CH alkyl ester can be converted to urea or urethane groups using, as appropriate, polyamines (polyamino alcohols), alcohols and the like.

The polyamines (a₂) contain at least two, preferably 2 to 10 amino groups; preferably, at least two of these groups are primary or one is primary and one is secondary. The number of carbon atoms of these amines is in general 2 to 40, preferably 2 to 20. Some of these primary amino groups can be blocked, for example by ketones in the form of ketimine groups.

Particularly suitable polyamines are those of the formula (II)

$$H_2N-(R_3NH)_p-R_4 \qquad (II)$$

in which
p is zero or an integer from 1 to 6, preferably 1 to 4,
$R_3$ represents a divalent, preferably nonaromatic, hydrocarbon radical having 2 to 18 carbon atoms, preferably a branched or unbranched alkylene radical having 2 to 10 carbon atoms, in particular having 2 to 6 carbon atoms, or a cycloalkylene radical having 5 to 12 carbon atoms, preferably 6 to 10 carbon atoms, or an aralkylene radical having 7 to 12 carbon atoms, preferably 8 to 10 carbon atoms, and
$R_4$ stands for H or

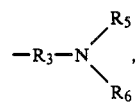

in which $R_3$ has the same meaning as above, and
$R_5$, $R_6$ either independently of each other stand for H, $(C_1-C_{20})$-alkyl, preferably $(C_1-C_6)$-alkyl, hydroxy$(C_1-C_{16})$-alkyl, preferably

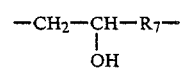

($R_7$=H, $(C_1-C_{12})$alkyl, $-CH_2-O-(C_1-C_{12})$-alkyl, $-CH_2-O$-aryl,

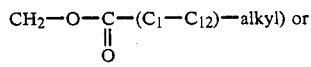

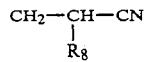

($R_8$=H or $(C_1-C_6)$-alkyl) or
$R_5$ and $R_6$ are part of a 5-, 6- or 7-membered aliphatic ring, with the proviso that, if m equals zero, $R_4$ is not equal to H.

In addition, suitable polyamines and polyaminopolyols are for example also those which have been described in German patent applications P 3,644,371.9 and P 3,726,497.4. This literature, including the preferred embodiments described therein, is herein incorporated by reference. Further compounds which can be used are polyaminoamides and also polyglycol polyamines or adducts of amines, such as epoxy resin adducts of amines.

Examples of suitable polyamines are: ethylenediamine, propylenediamine, 2-methylpentamethylenediamine, hexamethylenediamine, trimethylhexamethylenediamine, neopentyldiamine, octamethylenediamine, triacetonediamine, dioxadecanediamine, dioxadodecanediamine and higher homologs, cycloaliphatic diamines such as 1,2-, 1,3- or 1,4-cyclohexanediamine; 4,4'-methylene-bis-cyclohexylamine, 4,4-isopropylene-bis-cyclohexylamine, isophorone diamine, tricyclododecenyldiamine, menthanediamine, 4,4'-diamino-3,3'-dimethyl-dicyclohexylmethane, 3-aminomethyl-1-(3-aminopropyl-1-methyl)-4-methylcyclohexane, m-xylylenediamine, N-methylethylenediamine, hydroxyethylaminoethylamine, hydroxyethylaminopropylamine, N-aminoethylpiperazine, 2-aminoethylpiperazine, N,N-dimethylethylenediamine, N,N-dimethylpropylenediamine, N,N-dihydroxyethylethylenediamine, aliphatic polyamines such as diethylenetriamine, triethylenetetramine, tetraethylenepentamine, pentaethylenehexamine, iminobispropylamine, methyliminobispropylamine, bis(hexamethylene)triamine, tetrapropylenepentamine, hydroxyethyldiethylenetriamine; and also alkanolamines such as monoethanolamine, diethanolamine, aminoethylethanolamine, N-(2-hydroxypropyl)ethylenediamine, mono- or di-(n or iso)propanolamine, ethylene glycol bispropylamine, neopentanolamine, methylethanolamine, 2-(2-aminoethoxy)ethanol, 3-aminopropyltrialkoxysilane (alkoxy=methoxy, ethoxy, tridecycloxy), 2-amino-2-hydroxymethyl-1,3-propanediol, and similar compounds. Further suitable examples are reaction products of diamines such as for example ethylenediamine, propylenediamine, hexamethylenediamine, trimethylhexamethylenediamine, m-xylylenediamine with terminal epoxies, such as for example propylene oxide, styrene oxide, hexene oxide or with glycidyl ether such as phenyl glycidyl ether ethylhexyl glycidyl ether, butyl glycidyl ether, or with glycidyl esters such as "Cardura E", or with unsaturated compounds such as acrylonitrile, methacrylonitrile. This reaction has to be carried out in such a manner that only one of the two primary amino groups present is alkylated, that is reacted with the epoxies or unsaturated compounds mentioned. To this effect, the corresponding polyamino compound is used in excess. Of course, mixtures of amines can also be used.

The preparation of the curing component (A) according to the invention is carried out in accordance with methods known per se by reacting the starting compounds ($a_1$) and ($a_2$) with elimination of alcohol and/or carboxaminoamides and/or amidines and formation of polyaminoamides having a malonamide structure or a methanetricarboxamide structure.

The reaction can be carried out in the absence of a solvent or preferably in the presence of an inert solvent or diluent. Suitable inert solvents are for example: ethers, such as for example diethyl ether, tetrahydrofuran, dioxane, 1,2-dimethoxyethane, diethylene glycol dimethyl ether; ketones such as acetone, methyl ethyl ketone, cyclohexanone; (cyclo)aliphatic and/or aromatic hydrocarbons such as hexane, heptane, benzene, toluene, the various xylenes or mixtures of these hydrocarbons; halohydrocarbons such as methylenechloride. Highly suitable compounds are also solvents such as dimethylformamide and N-methylpyrrolidone. The reaction of the components ($a_1$) and ($a_2$) which is advisably carried out at temperatures from 20° to 120° C., preferably from 20° to 100° C., is preferably conducted under reduced pressure, for example between 150 and 20 mbar. The presence of a catalyst can be advantageous. Suitable catalysts are acidic catalysts, for example sulfonic acids such as p-toluene sulfonic acid, Lewis acids such as boron trifluoride, boron trifluorideamine complexes, zinc dichloride, titanium esters such as Ti(OBu)$_4$, carboxylic acids such as salicylic acid and similar compounds. The amount of catalyst is in general 0.1 to 5, preferably 0.1 to 0.5% by weight, based on the reaction mixture.

In the case where an adduct from an active CH alkyl ester and an isocyanate is preferably used as the component ($a_1$), this adduct is preferably prepared in an inert gas atmosphere and in the absence of moisture.

If a solvent is present, the abovementioned solvents can, for example, be used. Preferably, this reaction is carried out in the presence of basic compounds such as alcoholates, in particular alkali metal alcoholates such as lithium butylate, sodium methylate or potassium methylate, sodium or potassium phenolate and the like or metallic sodium, in amounts of about 0.1 to 5, preferably 0.1 to 0.5% by weight, based on the total weight of the reaction components. The amounts of isocyanate and active CH alkyl ester are preferably such that at least 1 mole of active CH alkyl ester is used per isocyanate group. A 10–50% excess of active CH alkyl ester can also be used.

The preparation of this adduct ($a_1$) and the reaction with a polyamine ($a_2$) can also be carried out in a single operation in which the individual components are metered in succession into the acidic C—H starting component. However, it is also possible to add the latter together with the catalyst, which is preferably used, to the isocyanate and then to meter in the polyamine. In general, the reaction is carried out in a temperature range from 20° to 120° C., preferably 20° to 100° C. The alcohol formed is distilled off under reduced pressure in the last step.

The amounts of ($a_1$) and ($a_2$) are in general selected in such a way that the ratio of equivalents of ester groups and—if present—keto or N=$R_1$ groups to primary-/secondary amino groups is 1:2 to 1:20, preferably 1:5 to 1:10. Excess ($a_2$) is preferably left in the curing component (A).

By selecting suitable ratios of the quantities of ($a_1$) to ($a_2$), the formation of crosslinked (gelled) products or of higher molecular weight products can be suppressed. Preferably, component (A) contains less than 5% by weight, in particular less than 1% by weight of crosslinked and/or higher molecular weight ($M_w > 5,000$) fractions.

The curing component (A) according to the invention contains at least one acidic —CH group and has preferably the following formula (III)

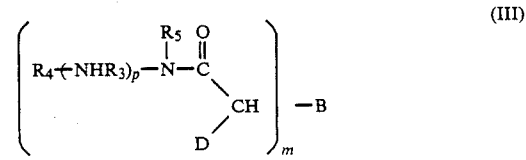

in which
B and m have the same meaning as in formula (I),
$R_3$, $R_4$ and p have the same meaning as in formula (II)
$R_5$ denotes hydrogen or $R_1$ as in formula (I);
D denotes hydrogen, CN,

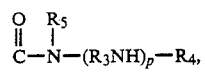

CONH$_2$, CONR$_1$H, CONR$_1$R$'_1$, COR$_1$ or R$_1$C=NR$_1'$, if B denotes H or R$_1$; denotes hydrogen, CN,

CONH$_2$, CONR$_1$H or CONR$_1$R$_1'$, if B denotes

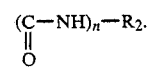

If the radical D contains primary/secondary amino groups, a molecule enlargement can be carried out via this radical and the radical $R_4$ or the secondary amino groups corresponding to the grouping (NH—$R_3$), resulting in oligomeric/polymeric products.

The amine number of the component (A) according to the invention is in general 60 to 800, preferably 150 to 800 mg KOH/g, the hydrogen equivalent weight is mostly between 30 and 400, preferably 40 to 300, and the molecular weight $M_w$ (average weight) is in general between 200 and 3,000, preferably between 200 and 1,000. The viscosity of (A) in the mixture containing excess ($a_2$) in general does not exceed values of 100,000 mPa·s and is preferably between 500 and 15,000 mPa·s. The number of primary and/or secondary amino groups per molecule (A) is in most cases at least 2, preferably 2 to 20 and in particular 2 to 10. If (A) is used in a mixture containing other curing agent, just one such amino group may be sufficient.

The curing component (A) according to the invention can also be used in a mixture containing other known epoxy resin curing agents which are compatible with (A), such as polyamines (including polyamine adducts, for example with epoxy resins) or other polyaminoamides.

In the case of polyamines, such mixtures are even preferred, these polyamines being preferably excess ($a_2$) from the preparation of the component (A). The amount of these additional curing agents is advantageously 10 to 90% by weight, preferably 30 to 90% by weight, based on the component (A).

The curing component (A) according to the invention can be used in curable mixtures together with preferably higher molecular compounds (B) containing epoxy and/or 1,3-dioxolan-2-one groups.

Examples of such compounds (synthetic resins) (B) are polyepoxies containing on average at least two epoxy groups per molecule. These epoxy compounds can be both saturated and also unsaturated and also aliphatic, cycloaliphatic, aromatic or heterocyclic and can also have hydroxyl groups. They can furthermore contain those substituents which do not cause any interfering side reactions under the mixing or reaction conditions, for example alkyl or aryl substituents, ether groupings and similar compounds.

Preferably, these epoxy compounds are polyglycidyl ethers based on polyvalent, preferably divalent alcohols, phenols, hydrogenation products of these phenols and/or of novolaks (reaction products of mono- or polyvalent phenols with aldehydes, in particular formaldehyde in the presence of acidic catalysts). The epoxy equivalent weights of these epoxy compounds (epoxy resins) are between 100 and 2,000, preferably between 160 and 500. Examples of polyvalent phenols which may be mentioned are: resorcinol, hydroquinone, 2,2-bis-(4-hydroxyphenyl)-propane (bisphenol A), mixtures of isomers of dihydroxydiphenylmethane (bisphenol F), tetrabromobisphenol A, 4,4'-dihydroxydiphenylcyclohexane, 4,4'-dihydroxy-3,3'-dimethyldiphenylpropane, 4,4'-dihydroxydiphenyl, 4,4'-dihydroxybenzophenone, bis-(4-hydroxyphenyl)-1,1-ethane, bis-(4-hydroxyphenyl)-1,1-isobutane, bis-(4-hydroxy-tert.-butylphenyl)-2,2-propane, bis-(2-hydroxynaphthyl)methane, 1,5-dihydroxynaphthalene, tris-(4-hydroxyphenyl)methane, bis-(4-hydroxyphenyl)ether, bis-(4-hydroxyphenyl)sulfone inter alia and also the chlorination and bromination products of the abovementioned compounds. Bisphenol A and bisphenol F are particularly preferred here.

The polyglycidyl ethers of polyvalent alcohols are also suitable. Examples of such polyvalent alcohols which may be mentioned are ethylene glycol, diethylene glycol, triethylene glycol, 1,2-propylene glycol, polyoxypropylene glycols (n=1-10), 1,3-propylene glycol, 1,4-butylene glycol, 1,5-pentanedial, 1,6-hexanediol, 1,2,6-hexanetriol, glycerol and bis-(4-hydroxycyclohexyl)-2,2-propane.

Polyglycidyl esters of polycarboxylic acids which can also be used are those which are obtained by reaction of epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedicarboxylic acid and dimerized linolenic acid. Examples are diglycidyl adipate, diglycidyl phthalate and diglycidyl hexahydrophthalate.

Suitable polyepoxy compounds are in some cases also triglycidyl isocyanurate or triglycidylurazol and also oligomers thereof, and also epoxy novolak resins.

These polyepoxy compounds can also be used in mixtures of each other and also, if appropriate, in mixtures containing monoepoxies. Suitable monoepoxies are for example: epoxidized mono-unsaturated hydrocarbons (butylene, cyclohexene, styrene oxide), halogen-containing epoxides, such as for example epichlorohydrin; epoxy ethers of monovalent alcohols (methyl, ethyl, butyl, 2-ethylhexyl, dodecyl alcohol); epoxy ethers of monovalent phenols (phenol, cresol and other o- or p-substituted phenols); glycidyl esters of unsaturated carboxylic acids, epoxidized esters of unsaturated alcohols or unsaturated carboxylic acids and also the acetals of glycidaldehyde.

A detailed listing of suitable epoxy compounds can be found in the handbook "Epoxidverbindungen und Epoxidharze" (Epoxy Compounds and Epoxy Resins) by A. M. Paquin, Springer Verlag, Berlin 1958, Chapter IV, in Lee, Neville "Handbook of Epoxy Resins", 1967, Chapter 2 and Wagner/Sarx, "Lackkunstharze" (Synthetic Resins for Paints), Carl Hanser Verlag (1971), p. 174 ff.

A further group of polyepoxy compounds for which the curing agents (A) can be used are epoxy group-containing acrylate resins, which are prepared in a known manner by using epoxy group-containing monomers.

Instead of the polyepoxy compounds, reaction products thereof with $CO_2$ can also be used as component (B). These products contain 1,3-dioxolan-2-one groups (cyclic carbonate groups) which can be reacted with primary amines to give urethanes. Depending on the molar ratios of polyepoxy compound and $CO_2$, the reaction with $CO_2$ gives compounds which do not contain any more epoxy groups, or compounds which have epoxy groups and cyclic carbonate groups. Such cyclic carbonate groups can also be introduced into the polymer chain via the corresponding monomers containing these groups; see in this contect DE patent applications P 3,644,372.7 and P 3,644,373.5.

The compounds containing the polyepoxy compounds or the cyclic carbonate groups can be reacted as such with the curing agents (A); however, it is often advantageous to react some of the reactive epoxy groups/cyclic carbonate groups with a modifying material to improve the film properties. Particular preference is given to the reaction of the epoxy groups/cyclic carbonate groups with a polyol or a polycarboxylic acid.

The molecular weight (weight average) of component (B), determined by gel chromatography (polystyrene as standard), is usually in the range of about 300 to about 50,000, preferably about 300 to about 20,000.

Component (B) and curing agent (A) are in general mixed in such ratios that the ratio of equivalents of active NH groups in (A) to epoxy and/or cyclic carbonate groups in (B) is 0.8 to 1.5, preferably 0.9 to 1.1. The corresponding amount of (A) will in most cases be about 20 to 60% by weight, preferably 20 to 40% by weight, based on (B). In this manner, a sufficient crosslinking density is generally obtained.

The curable mixture according to the invention can, if desired, contain a diluent (C), such as conventional inert organic solvents. Examples which may be mentioned here are: halogenated hydrocarbons, ethers such as diethyl ether, 1,2-dimethoxyethane, tetrahydrofuran or dioxane; ketones, such as for example methyl ethyl ketone, acetone, cyclohexanone and similar compounds; alcohols such as methanol, ethanol, propanol, butanol and benzyl alcohol, (cyclo)aliphatic and/or aromatic hydrocarbons such as hexane, heptane, cyclohexane, benzene, toluene, the various xylenes and also aromatic solvents in the boiling range of about 150° to 180° C. (higher-boiling mineral oil fractions such as R*Solvesso*). The solvents can be used individually or as a mixture.

Conventional additives as defined by (D) which may be present in the curable mixture according to the invention and which may be mentioned here in relation to their functional use are the conventional paint additives such as pigments, pigment pastes, antioxidants, flow control and thickening agents, antifoams and/or wetting agents, reactive diluents, fillers, catalysts, additional curing agents and additional curable compounds and the like. These additives can, if desired, be added to the mixture immediately before processing.

In accordance to one preferred embodiment, the curing agent (A) is initially, before it is added to the curable mixture, reacted with some of the synthetic resin (B), preferably with a maximum of 40% by weight. By this procedure, the compatibility with the synthetic resin (B) is often improved.

To prepare the curable mixtures according to the invention, the components (A) and (B) and also (C) and (D), if desired, are mixed together. In the case of components having a low viscosity, this mixing can be carried out in the absence of a solvent, optionally in conjunction with heating to higher temperature. Products having a higher viscosity are, if the curable mixtures are not used in the form of powder coatings, dissolved or dispersed in the diluents mentioned before mixing.

The mixtures according to the invention have the potential for a variety of industrial applications due to their advantageous properties, in particular the rapid curing even at low temperatures and even at high humidities leading to the incorporation of the curing agent (A) into the network, for example for preparing shaped articles (casting resins) for tool-making or for preparing coatings and/or intermediate layers on a variety of substrates, for example on those of organic or inorganic origin, such as wood, wood fiber materials (sealing of wood), textiles of natural or synthetic origin, plastics, glass, ceramics, construction materials such as concrete, fiber boards, artificial stones, but in particular on metal. Furthermore, the mixtures according to the invention can be used as ingredients of adhesives, cement, laminating resins, synthetic resin cements and in particular as ingredients of coatings and paints for coating industrial articles, household appliances, furniture, and also in the construction industry, such as for example refrigerating machines, washing machines, electrical appliances, windows, doors. Application can be, for example, by brushing, spraying, dipping and the like.

A preferred area of application for the mixtures according to the invention is the paint preparations.

The curing process of the mixtures according to the invention proceeds very rapidly and is in general carried out at −10° to 50° C., preferably 0° to 40° C. For example, curing at +5° C. and at a relative humidity of 95% for 8 to 24 hours or at room temperature for 1 to 4 hours already gives products having a high degree of hardness.

The curing reaction can be carried out in one step, by working with equivalent amounts of components (A) and (B). The potlife and the properties of the products therefore depend on the process conditions, that is the type and the amount of the starting materials, the range of temperature etc. Thus, the elasticity of the cross-linked product can be controlled within a tolerance range, for example through the chain length of the oligomers and/or polymers used for (A) and (B). Although the curing process is in general carried out batchwise, the invention comprises carrying out the mixing of the components and the reaction sequence in a continuous manner, for example by using an automatic coating apparatus.

In the Examples which follow, % is always % by weight and T is always parts by weight. Reduced pressure always refers to that of the aspirator. HAV denotes hydrogen equivalent weight. This value, the amine number and the yield are always based on the mixture of component (A) and excess polyamine ($a_2$) in the following Examples.

EXAMPLES

I. Preparation of the Curing Component (A)

1. 595 T of phenylisocyanate were metered into a mixture of 800 T of diethyl malonate, 350 T of toluene and 7 T of sodium methylate at 40° C. over a period of 2 hours, and the temperature of the mixture was kept between 40° and 60° C. After the addition was completed, stirring was continued at 60° C. up to a content of 0.5% of free N=C=O groups. 3,400 T of meta-xylylenediamine were then added, and the ethanol formed and toluene were distilled off in vacuo. During the distillation, the temperature was slowly increased to 80° C. After about 4 hours, the amine number was 510 and the yield of the light-yellow curing agent was 4,350 T having an HAV of 55. The free meta-xylylenediamine content in the product obtained was about 45–50%.

2. A mixture of 37.5 T off trimethylolpropane, 427.5 T of diethyl malonate, 210 T of xylene and 1.7 T of sodium methylate were metered into 376.5 T of isophoronediisocyanate at 60° C., and the temperature of the mixture was kept at 60° C. After a content of ≦0.5% of free N=C=O groups had been obtained, 5,176 T of isophoronediamine were added, and the solvent and ethanol were distilled off at 80° C. in vacuo. After 4 hours, an amine number of 530 was reached and the yield amounted to 5,844 T. The content of free isophoronediamine was about 70%.

3. Instead of 5,176 T of isophoronediamine from Example 2, 4,140 T of meta-xylylenediamine were used, and, as described, the solvent and ethanol were distilled off. After 4 hours, the yield was 4,715 T. The content of free meta-xylylenediamine was about 70%. The amine number was 490 and the viscosity 650 mPa·s/25° C., measured as a 70% strength solution in benzylalcohol.

4. 65 T of octanol were metered into 108.8 T of 2,4- and 2,6-toluylenediisocyanate at 60° C., and stirring was continued up to an 18% content of free N=C=O groups. 0.5 T of sodium methylate was then added and 118.5 T of diethylmalonate were metered in. After the addition was completed, stirring was continued at 60° C. up to a ≦0.5% content of free N=C=O groups.

243 T of meta-xylylenediamine were added to 140 T of this mixture, and 32.9 T of ethanol were distilled off at 80° C. in vacuo. After about 4 hours, the amine number was 435. The content of the free meta-xylylenediamine in the product obtained was about 40%. After the addition of 150 T of benzyl alcohol, the HAV of the curing agent was 92.

5a. 222 T of isophorone diisocyanate were metered into a mixture of 320 T of diethyl malonate, 1 T of sodium methylate and 136 T of xylene at 40° C. over 2 hours, and the temperature of the mixture was kept between 40° and 60° C. After a further 2 hours at 60° C., the N=C O content was 0.5%.

5b. 210 T of meta-xylylenediamine were added to 112.5 of this mixture 5a, and the solvent and ethanol were distilled off at 80° C. in vacuo. After 4 hours, the amine number was 493 and the yield amounted to 273 T. The content of free meta-xylylenediamine amounted to about 45%. After the addition of 136.5 T of benzyl alcohol, the curing agent had an HAV of 86 and a viscosity of 1,200 mPa·s at 25° C.

5c. 214 T of hexamethylenediamine were added to 100 T of this mixture 5a and, as described in Example 5b, the solvent and ethanol were distilled off. After 4 hours, an amine number of 579 was reached and the yield amounted to 274 T. The content of free hexamethylenediamine was about 55%.

6. A mixture of 320 T of diethyl malonate and 1 T of sodium methylate were metered into a solution consisting of 168 T of hexamethylene diisocyanate in 500 T of methylene chloride at 25° C. over one hour, in the course of which the temperature increased to reach reflux temperature. Stirring was continued at 35° C. for another 2 hours. The content of free N=C=O groups was then 0.2%. The methylene chloride was distilled off in vacuo to give a crystalline compound having a melting point of 110°–120° C.

279 of meta-xylylenediamine were added to 100 T of this substance which was not further purified, and the ethanol formed was distilled off at 60° C. in vacuo. After 6 hours, the amine number amounted to 530 and the yield to 339 T. The content of free meta-xylylenediamine was about 50%. After the addition of 145 T of benzyl alcohol gave a curing agent having an HAV of 89.

7. A mixture of 320 T of diethyl malonate and 1.5 T of sodium methylate were metered into a solution consisting of 250 T of 4,4'-diphenylmethane diisocyanate and 100 T of toluene at 40° C. over a period of 2 hours, and the temperature of the mixture was kept between 40° and 60° C. After stirring had been continued at 60° C. for 2 hours, the content of free N=C=O was 0.5%. 304 T of isophoronediamine were added to 120 T of this mixture, and the solvent and ethanol were distilled off in analogy to Example 1. After 4 hours, the yield obtained was 368 T having an amine number of 393. The content of free isophoronediamine was about 50%.

8. 119 T of phenyl isocyanate were metered into 130 T of ethylacetoacetate and 0.2 T of sodium methylate at 60° C., and the mixture was kept at 60° C. for 5 hours, after which time the N=C=O content was 0.2% and the yield amounted to 250 T. The mixture must be kept at 60° C., since the pure compound cystallizes out at 56° C. 340 T of meta-xylylenediamine were added to this mixture, and, as described in Example 1, ethanol was distilled off. After about 4 hours, the amine number amounted to 310 and the yield to 542 T. The content of free meta-xylylenediamine was about 12%. This mixture was diluted with 425 T of isophoronediamine to give a curing agent having an HAV of 60.

II. Preparation of Curable Mixtures and Test of the Application Properties of the Cured Product The amounts by weight of component (A) listed in the following Table were mixed at room temperature with the equimolar amounts given of an epoxy compound (→component (B)) liquid, namely a diglycidyl ether of bisphenol A (epoxy equivalent weight: 186; viscosity: about 10,000 mPa·s at 25° C.; ®Beckopox EP 140). The coating material obtained was applied to glass plates (clear coat film) in a film thickness of 200 μm by means of a doctor blade and cured at room temperature or 5° C. and a relative humidity of 95% for 24 hours or 7 days. For comparison, a Mannich base consisting of phenol, meta-xylylenediamine and formaldehyde in analogy to DE Offenlegungschrift 2,025,343, Example 1 was tested (content of free phenol: about 17% by weight). The abbreviations used in the following Table have the following meanings:

K=Air-conditioning cabinet 5° C./95% r.h.
RT=Room temperature
BzOH=Benzylalcohol
EP 140=Diglycidyl ether of bisphenol A
d=Days

| | Component (A) | | Component (B) (EP 140) Amount | BzOH Amount | Pot Life (min) | Pendulum hardness according to Konig(s) | | | |
|---|---|---|---|---|---|---|---|---|---|
| Example | Type | Amount | | | | after 1 d at RT | after 7d at RT | after 1 d at K | after 7 d at K |
| 1 | A 1 | 23.1 | 76.9 | — | 17 | 206 | 206 | 19 | 127 |
| 2 | A 2 | 23 | 61.6 | 15.4 | 29 | 165 | 198 | 22 | 120 |
| 3 | A 3 | 16.1 | 71.8 | 12.1 | 23 | 183 | 187 | 63 | 154 |
| 4 | A 4 | 33.1 | 66.9 | — | 19 | 97 | 146 | 14 | 116 |
| 5 | A 5b | 30.1 | 69.9 | — | 15 | 147 | 185 | 45 | 105 |
| 6 | A 6 | 32.2 | 67.8 | — | 23 | 133 | 170 | 37 | 80 |
| 7 | A 7 | 24.7 | 64.6 | 10.6 | 26 | 131 | 171 | 6 | 40 |
| 8 | A 8 | 24.4 | 75.6 | — | 26 | 103 | 157 | 64 | 94 |
| Comparison | Mannich base | 27.9 | 72.1 | — | 18 | 190 | 210 | 46 | 130 |

We claim:

1. An amino group-containing curing component (A) for compounds (B) containing epoxy or 1,3-dioxolan-2-one groups, wherein the curing component (A) is a reaction product from (a$_1$) isocyanate adducts of active CH alkyl esters with (a$_2$) polyamines, and wherein the curing component (A) has an amine number of 60 to 800 mg KOH/g, hydrogen equivalent weight of 30 and 400, and a molecular weight $\overline{M}_w$ (weight average) of 200 to 3000.

2. A curing component as claimed in claim 1, wherein (a$_2$) contains at least two primary amino groups or a primary and a secondary amino group.

3. A curing component as claimed in claim 1, wherein the ester equivalents of (a$_1$) and also the C=O— or N=R'$_1$ equivalents which may be present, relative to the amino equivalents of (a$_2$) are 1:2 to 1:20.

4. A curing component as claimed in claim 1, wherein (a$_1$) is an isocyanate adduct of an ester of malonic acid, acetoacetic acid or cyanoacetic acid having 1 to 6 carbon atoms in the ester radical.

5. A curing component as claimed in claim 1, wherein (a$_2$) has the Formula II $$H_2N-(R_3NH)_p-R_4 \qquad II$$

in which p is zero or an integer from 1 to 6, $R_3$ represents a divalent hydrocarbon radical having 2 to 18 carbon atoms, and $R_4$ stands for H or

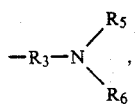

in which $R_3$ has the same meaning as above, and $R_5$, $R_6$ either independently of each other stand for H, $(C_1-C_{20})$-alkyl, hydroxy-$(C_1-C_{16})$-alkyl, or

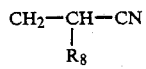

$R_8 = H$ or $(C_1-C_6)$-alkyl or $R_5$ and $R_6$ are part of a 5-, 6- or 7-membered aliphatic ring, with the proviso that, if p equals zero, $R_4$ is not equal to H.

6. A curing component as claimed in claim 1, having the Formula III

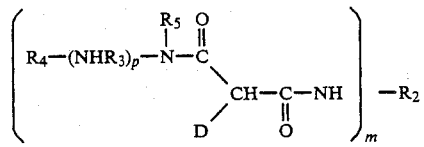

in which $R_2$ and m have the same meaning as in Formula I; $R_3$, $R_4$ and p have the same meaning as in Formula II of claim 5; $R_5$ denotes hydrogen or $R_1/R_1'$ as in Formula I; and D denotes hydrogen, CN,

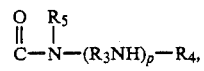

$CONH_2$, $CONR_1H$ or $CONR_1R_1'$.

7. A curing component as claimed in claim 5, wherein the radicals $R_5$ and $R_6$ independently of one another stand for

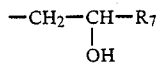

($R_7 = H$, $(C_1-C_{12})$Alkyl, $-CH_2-O-(C_1-C_{12})$Alkyl, $-CH_2-O-$Aryl,

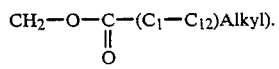

8. A curing component as claimed in claim 1, wherein ($a_1$) has the formula I

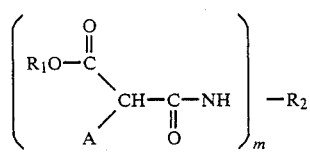

in which $R_1$ denotes a hydrocarbon radical having 1 to 12 carbon atoms; $R_2$ represents an m-valent hydrocarbon radical, which can optionally be interrupted by hetero atoms (O, N); A denotes CN, $COOR_1$, $CONH_2$, $CONR_1H$, $CONR_1R_1$, $COR_1$, $R_1C=NR_1'$ or $NO_2$ it being possible for $R_1$ and $R_1$ to be identical or different and to have the above mentioned meaning; and m is equal to or greater than one.

9. A curing component as claimed in claim 8, wherein n denotes 1, 2 or 3.

10. A curing component as claimed in claim 8 wherein in Formula I, $R_1$ stands for $(C_1-C_6)$-alkyl, and A denotes $COO(C_1-C_6$-alkyl) or for $CO(C_1-C_6$-alkyl).

* * * * *